May 13, 1958     J. V. HUNN     2,834,052
METHOD OF MAKING MOLD MASTERS
Filed Jan. 14, 1954     2 Sheets-Sheet 2

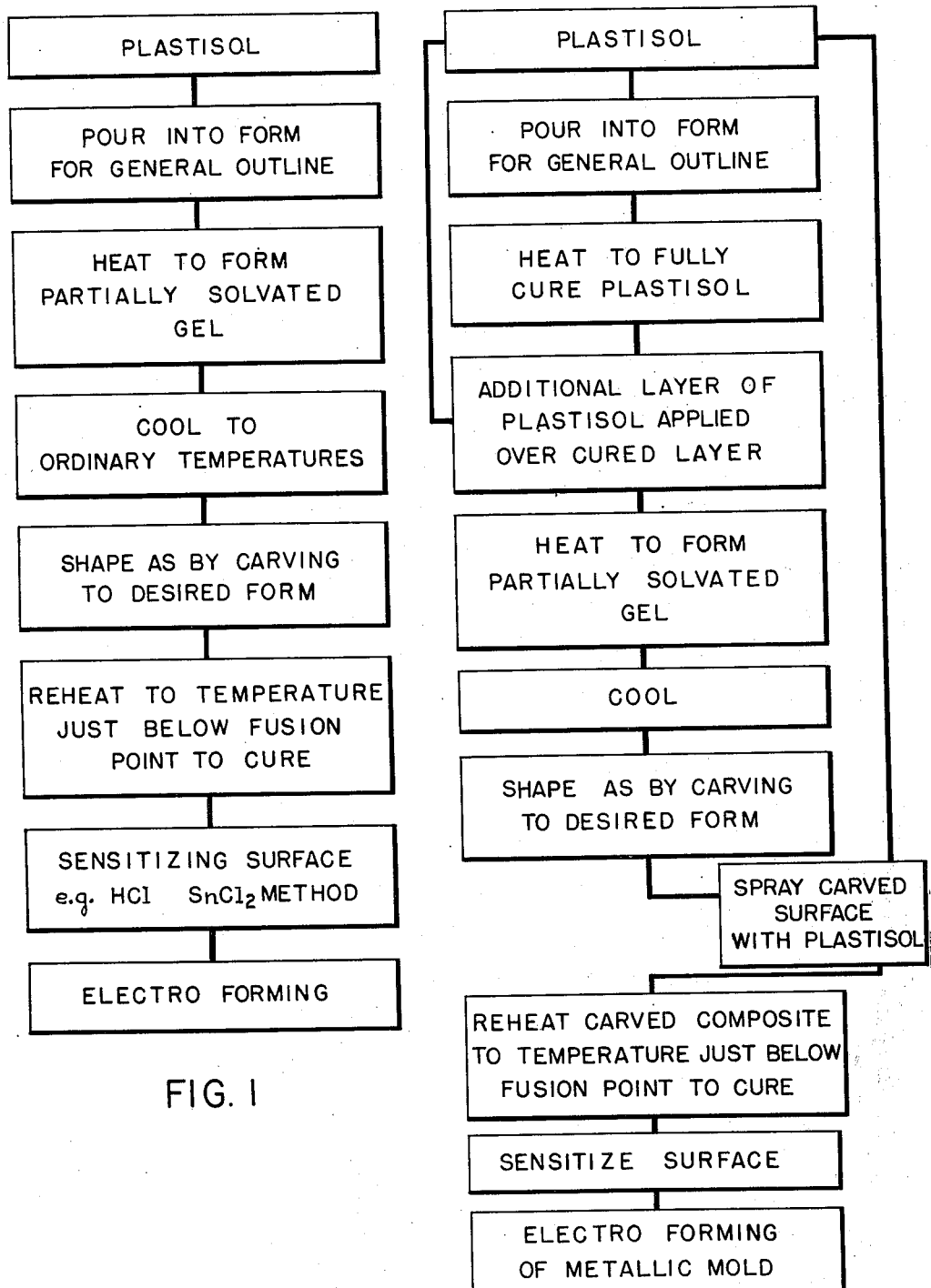

INVENTOR.
JAMES V. HUNN
BY
*Robert A. Stinges*
ATTORNEY

United States Patent Office 2,834,052
Patented May 13, 1958

2,834,052

METHOD OF MAKING MOLD MASTERS

James V. Hunn, Avon Lake, Ohio, assignor to The Sherwin-Williams Company, Cleveland, Ohio, a corporation of Ohio Application January 14, 1954, Serial No. 404,136

14 Claims. (Cl. 18—47.5)

This invention relates to a novel method of making molds and more particularly to certain novel steps in the process of making molds which obviate steps normally taken in prior processes.

The usual metal mold making procedure has heretofore involved the making of a paster of Paris mold from a sculptured model. After the plaster became set, the sculptured model was removed and wax cast into the plaster mold and allowed to harden. The wax model was then prepared for electroplating with a metal, such as copper, by immersion in a hydrochloric acid solution of stannous chloride to provide an acidic base for the sensitizer, and then immersed in a silver nitrate-aqueous ammonium hydroxide solution to sensitize the surface. The final step in producing the mold was electroplating. This operation required a long time, often several days to a week. After the plating operation, the wax was melted or burned out and the mold was then ready for production of molded articles.

There are several difficulties with wax as a material from which to make such a master. It is fragile and has no elasticity. The surface is very hydrophobic, complicating the electro-deposition process. If the master is cast from a negative, there is usually a considerable amount of shrinkage. The wax is heat sensitive and subject to distortion when heated or handled. The wax is also difficult to carve because of its brittleness.

It has now been found that the relatively new materials, plastisols, are admirably suited for use in the construction of masters from which one or more molds can be made. These plastisols when utilized in the manner hereinafter set forth avoid or substantially ameliorate the difficulties heretofore characteristic of wax and have several advantages not possessed in any degree by wax.

It is a principal object of this invention, therefore, to provide a novel method of making a mold.

Another object of this invention is to provide a process for utilizing plastisols as a positive for the making of metallic, plastic, plaster, rubber, etc. molds.

Still another object of this invention is to provide a method of making a durable, accurate positive useful in fabricating by electroplating means a metallic mold.

Other objects of this invention will appear as the description proceeds.

To the accomplishment of the foregoing and related ends, said invention, then, consists of the means hereinafter fully described and particularly pointed out in the appended claims, the following description setting forth in detail certain embodiments of the invention, such disclosed means constituting, however, but a few of the various forms in which the principle of my invention may be employed.

Broadly stated, this invention comprises a process for making molds which includes the steps of gelling a liquid plastisol, cooling said gelled plastisol, shaping said gelled plastisol and then reheating said shaped gelled plastisol to a temperature below the fusion point of said plastisol, but sufficient to completely solvate said plastisol.

In carrying out this invention, use is made of certain properties of plastisols which have not heretofore been recognized as useful in the art of mold making and which greatly improve the results obtainable in many respects. A plastisol may be defined as an unplasticized vinyl resin dispersed in plasticizer. These are normally liquid materials. The freshly prepared plastisol will generally show a small increase in viscosity on standing at room temperature due to a very minor amount of solvation of the plasticizer into the resin. This appears to stop after a few days and the two-phase system becomes quite stable. Plastisols are produced from powdered polyvinyl resins, such as, polyvinyl chloride and co-polymers thereof with polyvinyl esters, e. g., polyvinyl acetate, by dispersing the unplasticized powdered resin in a plasticizer for the resin. In the co-polymers, it is desirable to keep the percentage of vinyl ester low, i e., no more than about 10%. The molecular weight of the vinyl halide resins used in the plastisols is desirably very high, i. e., on the order of 50,000 to 150,000 or more.

Under present day practices, plastisols are prepared by using "stir-in" resins in powdered form. In other words, the powdered resin is merely stirred into the proper amount of plasticizer at about room temperature. It has been found in the course of the development of this invention that improved results hereunder are obtained if the plastisol is made by grinding the resin into the plasticizer at a low temperature, e. g., room temperature, up to about 100° F. using the grinding techniques common in the coatings industry, such as roller milling. A finer dispersion is thus obtained improving the solvation rates at elevated temperatures and reducing the tendency to crumbling of the gel where very fine detail is being sought. Use of a polymeric plasticizer aids in decreasing the tendency to crumble present in certain plastisols. From 5% to 20% or more of such plasticizer is useful in this regard.

The plasticizer may be either of the monomeric type, such as, tricresyl phosphate, di-octyl phthalate, dibutyl phthalate, dibutyl sebacate, ortho nitro-diphenyl ether, etc., or of the polymeric type, e. g., polyesters. The dispersion of the unplasticized polyvinyl halide powder in the plasticizer yields a pourable liquid of about the consistency of paint, and at room temperature after initial adjustment it will maintain stability over a long period of time. The plastisol may be poured into mold or form and cured by the application of heat at temperatures of just below the fusion point of the vinyl resin. Under the action of heat further solvation occurs and the plasticizer is absorbed into the resin and a solid rubber-like product is obtained. Reference may be had to the patent to Semon, 2,188,396 dated January 30, 1940 for more specific details as to plastisols useful herein. Other useful plastisols are well known to those skilled in the art and need not be mentioned here.

In general, the useful plastisols are characterized in that they have separate and distinct complete solvation and gellation temperatures. Gellation in a plastisol may be defined as that degree of partial solvation where the material changes from a non-solvated or partially solvated liquid to a partially solvated solid. These two temperatures should differ by at least about 15° F., and even more desirably by at least about 30° F. The complete solvation temperature of the plastisol while not necessarily a property of the resin alone, is more readily attributed to the resin and does not vary as widely from the true fusion point of the pure resin as does the gelling point when different plasticizers are used. For example, a plastisol composed of 100 parts of polyvinyl chloride (powder) and 140 parts of di-octyl phthalate has a complete solvation temperature of about 350° F., and a gellation temperature of from 210° F. to 220° F. This composition is useful herein. With a polyester type plasticizer and about the same ratio of polyvinyl chloride to plasticizer, the gellation temperature is from about 300° to 320° F. and the complete solvation point is about 350° F. This composition is also useful herein. This difference in complete solvation and gellation temperatures is made use of in this invention. These temperatures are not to be confused with the fusion temperature of the resin in the plastisol. The fusion temperature is the point at which the resin in combination with the plasticizer melts and flows. The complete solvation temperature is just below this point and hence the shape imparted to the gelled plastisol is not lost or distorted by heating to the complete solvation point.

These plastisols when merely gelled have a consistency like ordinary soap. When completely solvated, or fused, however, they have a rubbery consistency. The plastisol after low temperature gelling or curing at a temperature below the complete solvation point can be carved with ordinary carving tools into any desired shape, design, or pattern with great sharpness of detail. The material being non-brittle peels or abrades nicely before a hand or mechanical tool and does not chip, crack, or break up on cutting as does wax or other carving media. Since the pressure on the carving tool is even and not suddenly altered as by chipping of waste material from the cuttings before the tool edge, the ease, accuracy, and detail obtainable are superior to other carving media.

It should be pointed out that the gelled plastisol described is different from the "Plastigels" which are plastisols thickened with metallic soaps such as aluminum stearate or other thickeners like bentone. Plastigels do not carve readily like heat gelled plastisols.

The carved article may then be completely cured or completely solvated by heating in an oven at a temperature close to but below the fusion temperature, that is, in the range of from about 325–360° F. for a polyvinyl chloride plastisol, at which point the final physical properties of the plastic are developed. If too high temperatures are used for the final cure, that is, temperatures at or above the fusion temperature, the sharp edges in the design, pattern, or shape will be lost. But, if temperatures corresponding to about the initial softening point of the resin are used, the final cured product will have the same sharpness of detail as the original carving.

The final cured carved or otherwise shaped object may then be used directly in the preparation of metallic molds for exact reproduction of the particular carving produced. This may be done by established methods of electroforming, i. e., the direct electrolytic deposition of a metal, such as copper, upon the surface of the cured plastic article.

It is readily apparent that by the procedure outlined above, a direct method of producing carvings and production molds is possible, much simpler than methods now in commercial use. A further advantage of this direct method is that minimum shrinkage from the original pattern or carving is obtained, because in the old procedures involving more steps, shrinkage occurs at each step.

In order to illustrate a highly satisfactory mode of employing the principles of this invention, the following procedure may be cited. A thin blanket or sheet of plastisol about $\frac{1}{16}$ inch thick is poured into a form approximating the general outline of the carving which is to be made, for example, a rectangular form, and completely cured at the higher temperature (325° to 360° F.) to its ultimate rubbery consistency. After this sheet has been cured and cooled, an additional quantity of the same plastisol is poured over this plastic sheet while still in the same rectangular form to a desired thickness for carving. The entire form and contents is then reheated, this time, however, to a temperature well below the complete solvation point but above the gellation point, i. e., 210 to 220° F.

At this point it may be mentioned that with certain plasticizers, the time of this partial solvation called gellation is not critical and although the plastisol should be gelled at a temperature not less than about 210° to 220° F. for a minimum period of about 20 to 30 minutes, it makes no difference how long the plastisol is subjected to this heat. Apparently there is a very stable condition occurring within the temperature range between the gellation point and the complete solvation point with plasticizers derived from phthalic acid, such as di-octyl phthalate and dibutyl phthalate. Such aliphatic alcohol esters of phthalic acid appear to reach only a certain degree of solvation with polyvinyl halide resins and proceed no further regardless of time of exposure after gellation has occurred and until the temperature is increased to the complete solvation point. The time within which the plastisol sets up or gels is, of course, dependent to some extent upon the proportion of plasticizer or solvating medium in the composition and also upon the thickness of the body in which gellation is to occur due to the rate of heat transfer. In general, about 2 hours is sufficient to solidify or gel a plastisol composed of 100 parts of polyvinyl chloride and 100 parts of di-octyl phthalate. This latter composition is also useful in this invention. For a sheet of plastisol about ¼ inch thick, exposure to gellation temperatures for a period of about 2 hours on a glass sheet or substrate is sufficient. Again, with the composition last mentioned above, such a sheet of plastisol might be left in the furnace at 210–220° F. over night without visibly altering the consistency of the plastisol as it appears at the end of 2 hours.

The carver then has a predetermined thickness of material superimposed on a rubber-like backing plate of the same plastisol through which to carve, and in developing his art work, the carver cuts through the gelled layer to the completely cured base underlying the gelled layer and lightly adhered thereto, which base layer is not easily cut. Areas of gelled plastisol that are not desired in the final design or pattern can be easily removed by cutting through to the base layer, because at this stage, the adhesion is at a minimum and the layers are readily separated at the interface. This facilitates and increases the ease and speed of carving.

A further refinement in this process consists in taking the carved partially cured article and coating it with a thin coat of ungelled, uncured plastisol such as by coating the entire gelled plastisol and fully cured plastisol laminate with a paint brush dipped in the original liquid plastisol material. The plastisol may be spray applied to the composite plastisol form after the shaping operation. This smooths out any roughness in the carving and serves to cement the raised portions of the carving to the cured base after the composite article has been submitted to the final curing temperatures at slightly below the fusion point of the plastisols.

If it is desired to produce a small number of duplicates of the original carving, this may be accomplished in the following manner. The carved article after final curing at just below the fusion point temperature is coated with a parting compound. One such parting compound that has been found to be most satisfactory is a 1% to 2% solution of methyl cellulose in water to which has been added a small amount of a surface active agent such as Aerosol O. T. (Bis(2-ethylhexyl) sodium sulfo-succinate). After the surface has been coated with a parting agent and dried to eliminate all moisture, liquid plastisol is poured over the carving to a sufficient depth to submerge the entire intaglio surface plus an additional amount to serve as a backing, and this entire composite again submitted to a curing temperature of about 350° F. for a period of time sufficient to completely cure or solvate the additional plastisol.

The time required to effect complete solvation appears to be only that which is required to heat the article being cured to the cure temperature throughout. For a piece about ¼ inch thick, 15 to 20 minutes is sufficient. Of course, the thicker the item being cured the longer the time required to bring the entire mass to within the temperature range of about 320° F. to 360° F. No chemical reaction is involved in curing the plastisols. Thus, depending upon the thickness of the piece being cured, the time may range anywhere from a few minutes to 1 or 2 hours. Exposure of the original carving a repeated number of times to the curing temperature as aforesaid does not appear in any way to affect the properties of the original carving or introduce any distortion in the pattern. After curing, a negative impression of the carving can be obtained by separating the two pieces as the parting compound at the interface prevents fusion of the plastisol to the cured carving. Other modes, compounds, compositions, etc. for preventing adhesion of the negative plastisol portion to the cured carved positive will become readily apparent to those skilled in the art.

The negative so produced can then be used for reproducing the original by the same process utilizing a suitable parting compound.

The cured shaped positive is then ready for treatment preparatory to electroplating. The HCl—SnCl₂ method of sensitizing above mentioned may be used or the surface may be sprayed with a molten metal, such as silver, utilizing new techniques of metal spraying. Electroplating is then done in the usual manner to yield a metallic mold from which production copies of the original can be made. These molds are ordinarily about 1/16 to 1/8″ thick. The flat carved shaped plastisol positive of the present example was wrapped about a wooden cylinder of circumference equal to the length of the positive and electroplated in the cylindrical form to yield a mold for use in a rotational casting process for producing design roller sleeves.

Another distinctly advantageous characteristic of these plastisols in this art is the fact that any design to be carved in the gelled plastisol may be drawn directly on the surface of the gelled plastisol preferably with a ball point pen, or the design may be drawn on a hectograph master sheet, the inked negative so obtained being placed on the surface of the gelled plastisol and the art work transferred to the gelled plastisol by moistening with the regular hectograph fluid (an alcohol-water solution). This very materially assists the artist or designer or engraver in his carving operation.

In the annexed drawings:

Fig. 1 is a flow diagram illustrating one embodiment of the present invention.

Fig. 2 is a flow diagram illustrating a more specific embodiment of the present invention demonstrating the use of a precast fully cured base over which is formed a gelled layer which can be shaped as desired.

Figure 3:
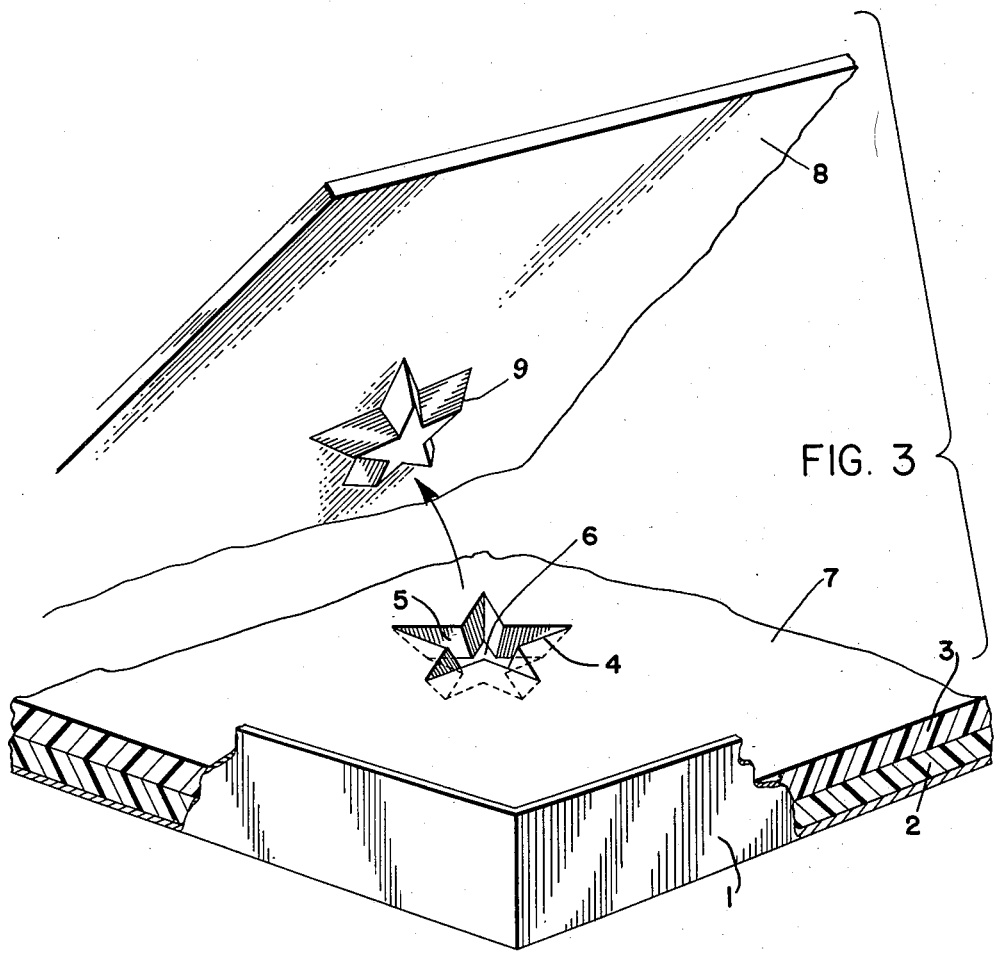

Fig. 3 is a fragmentary view of the master mold and an electro-formed metal production mold made therefrom. In Fig. 3 the general form is outlined by a suitable container 1. The interior of the general form contains a fully cured plastisol layer 2 and superimposed thereover a second layer 3. Prior to fully curing the entire mass, the second layer, then only partially cured, is shown with a carved shape 4 therein. The walls 5 of said curved shape may slope downwardly and inwardly to yield a final shape as shown at 6. The exposed surface of the shape 6 is the surface of the fully cured layer 2. After fully curing the composite, the surfaces 6 and 7 may be sensitized for electroforming as customary in the art of electroforming about irregularly shaped nonconducting articles. The electroformed mold 8 results carrying a raised portion 9 corresponding to the carved portion 4 in the master.

It becomes convenient at this point to illustrate the composition of certain plastisols which may be used in the practice of this invention, it being understood, however, that any plastisol whether based on polyvinyl halides alone or other well known plastic materials may be used so long as they are characterized in undergoing partial solvation to an extent sufficient to provide a rigid carvable gelled body at a temperature sufficiently below the fusion point of the composition to permit interrupting the curing operation before complete solvation has occurred. These specific examples are for illustrative purposes only and are not to be construed as limiting the invention to the precise scope thereof as it becomes a simple matter to formulate by experimentation a vast number of resin-plasticizer compositions which by process of elimination can be found suitable for the purposes of this invention.

*Example I*

| | Parts |
|---|---|
| Powdered polyvinyl chloride | 100 |
| Di-octyl phthalate | 100 |

*Example II*

| | Parts |
|---|---|
| Powdered polyvinyl chloride | 140 |
| Di-octyl phthalate | 100 |
| Dilead phosphite | 7 |

*Example III*

| | Parts |
|---|---|
| Powdered polyvinyl chloride-vinyl acetate (98%–2% respectively) | 100 |
| Dibutyl phthalate | 90 |
| Dilead phosphite | 5 |

*Example IV*

| | Parts |
|---|---|
| Powdered polyvinyl chloride | 100 |
| Di-butyl phthalate | 100 |
| Dilead phosphite | 5 |

*Example V*

| | Parts |
|---|---|
| Powdered polyvinyl chloride | 100 |
| Tricresyl phosphate | 95 |
| Dilead phosphite | 5 |

*Example VI*

| | Parts |
|---|---|
| Powdered polyvinyl chloride | 100 |
| Dibutyl sebacate | 100 |
| Sodium sorbate | 5 |

*Example VII*

| | Parts |
|---|---|
| Powdered polyvinyl chloride | 100 |
| Di-octyl phthalate | 50 |
| Acetylated castor oil monoglyceride | 50 |

*Example VIII*

| | Parts |
|---|---|
| Powdered polyvinyl chloride | 100 |
| Di-octyl phthalate | 100 |
| Dibasic lead phosphite | 6 |

The foregoing examples represent but a few of the plastisol compositions which may be used in accordance with this invention. In general, these plastisols are colorless and yield a white or milky gel because of the two-phase system of resin dispersed in and partially solvated with plasticizer. Other ingredients may be incorporated in these compositions in amounts insufficient to substantially alter the physical properties of the plastisol essential to this invention but in amounts sufficient to impart color, for example, or sufficient to improve the hydrophilic character of the surface thereby aiding the electroplating operation, or flow control agents, such as magnesium silicate (Santocel C), may be added to prevent undue flowing of the material during the gellation and complete solvation stages. If hydrophobic characteristics are desired, such flow control agents are incoporated in the composition when it is desired to re-coat the surface of the carved article either for purposes of adhesion or intaglio portions to the base and/or, for removing sharp angular corners at the intersection of the intaglio portion and the base to improve the electroplating operation. From 3% to 20% powdered graphite may be suspended in the formulations above given to improve the conductivity for electroplating purposes.

It also appears from the foregoing examples that the plasticizer portion may be composed of more than one plasticizer. The well known polyvinyl halide plasticizers are generally of the "primary" type, whereas plasticizers of the type represented by acetylated castor oil monoglyceride are of the secondary type and must be used in combination with one or more primary plasticizers. The aforementioned secondary plasticizer also confers upon the product desirable characteristics of heat and light stability.

It also appears from the foregoing examples that other powdered unplasticized resinous material may be used such as, for example, polyvinyl bromide, polyvinyl chloride-vinyl butyrate copolymers, and other such aliphatic acid esters of polyvinyl alcohol co-polymerized with polyvinyl chloride. These are generally of very high molecular weights, i. e., 50,000 to 150,000 or more.

Heat and light stabilizers may be incorporated in the formulas in amounts up to about 3% by weight. These may be of the soluble type which dissolve in the plastisol or of the insoluble type. Usually these materials are acid acceptors which because of their basic nature accept HCl or HBr and prevent it from catalyzing further decomposition of the vinyl halide. Such materials include dibasic lead phosphite (dilead phosphite), tribasic lead sulphate, sodium sorbate, etc., all of which are well known for this purpose.

Under normal conditions, the gelled plastisol is a milky white opaque solid. The freshly prepared liquid dispersion is also milky white. Upon complete solvation, the plastisol will become transparent unless insoluble pigments or stabilizers are included.

This invention is particularly useful in the field of making molds for casting design imprinting rolls by the hollow rotational casting methods particularly pointed out and claimed in the patent to Molitor 2,629,134 and the patent to Delacoste 2,624,072. The adaptability of this process in other mold making fields is believed evident such as in engraving and special kinds of printing operations, e. g., wallpaper printing rolls.

Other modes of applying the principles of this invention may be employed instead of those specifically set forth above, changes being made as regards the details herein disclosed, provided the elements set forth in any of the following claims, or the equivalent of such be employed.

I, therefore, particularly point out and distinctly claim as my invention:

1. A process for making molds which includes the steps of gelling a liquid plastisol to form a solid body, cooling said gelled plastisol, shaping said gelled plastisol body by removing material therefrom to form a design in the surface thereof, and then reheating said shaped gelled plastisol to a temperature below the fusion point of said plastisol, but sufficient to completely solvate said plastisol.

2. A process for making molds which includes the steps of gelling a liquid polyvinyl halide-containing plastisol to form a solid body, cooling said gelled plastisol, shaping said gelled plastisol body by removing material therefrom to form a design in the surface thereof, and then reheating said shaped gelled plastisol to a temperature below the fusion point of said plastisol but sufficient to completely solvate said plastisol.

3. A process for making molds which includes the steps of gelling a liquid plastisol, to form a solid body, cooling said gelled plastisol, shaping said gelled plastisol body by removing material therefrom to form a design in the surface thereof, reheating said shaped gelled plastisol to a temperature below the fusion point of said plastisol, but sufficient to completely solvate said plastisol, and electrolytically casting a metal on the surface of the cured plastisol form.

4. A process for making molds which includes the steps of forming a fully cured plastisol base, superimposing over said fully curved base a solid layer of gelled but uncurved plastisol, shaping said gelled plastisol layer by removing material therefrom to form a design in the surface thereof, and heating the composite plastisol form to a temperature below the fusion point of said plastisol, but sufficient to completely solvate the gelled portion of said plastisol form.

5. A process for making molds which includes the steps of forming a fully cured plastisol base, superimposing over said fully cured base a solid layer of gelled but uncured plastisol, shaping said gelled plastisol layer by removing material therefrom to form a design in the surface thereof, coating the entire composite shaped form with a thin coating of liquid plastisol, and heating the composite plastisol form to a temperature below the fusion point of said plastisol, but sufficient to completely solvate the liquid and gelled portions of said plastisol form.

6. A process for making molds which includes the steps of forming a fully cured plastisol base, superimposing over said fully cured base a solid layer of gelled but uncured plastisol, shaping said gelled plastisol layer by removing material therefrom to form a design in the surface thereof, coating the entire composite shaped form with a thin coating of liquid plastisol, heating the composite plastisol form to a temperature below the fusion point of said plastisol, but sufficient to completely solvate the liquid and gelled portions of said plastisol form, rendering the surface of the fully cured shaped plastisol form electrically conductive, and electrolytically casting a metal on the electrically conductive surface of the cured plastisol form.

7. A process for making molds which includes the steps of gelling a plastisol composed of about equal parts by weight of powdered polyvinyl chloride and a plasticizer therefor by heating to a temperature not in excess of about 320° F. for a period of time sufficient to gel said plastisol to form a solid body, cooling said gelled plastisol, shaping gelled plastisol body by removing material therefrom to form a design in the surface thereof to a desired form, and reheating the shaped gelled plastisol to a temperature not in excess of about 360° F. or less than about 325° F. for a period of time sufficient to cure said plastisol.

8. A process for making molds which includes the steps of gelling a plastisol composed of about equal parts by weight of powdered polyvinyl chloride and a plasticizer therefor by heating to a temperature not in excess of about 320° F. for a period of time sufficient to gel said plastisol to form a solid body, cooling said gelled plastisol, shaping the gelled plastisol body by removing material therefrom to form a design in the surface thereof to a desired form, coating the surface of the shaped gelled plastisol with a thin coating of liquid plastisol of equivalent composition to the gelled material, reheating the coated shaped gelled plastisol to a temperature not in excess of about 360° F. or less than about 325° F. for a period of time sufficient to cure said plastisol, rendering the surface of the fully cured shaped plastisol electrically conductive, and electrolytically casting copper on the electrically conductive surface of the cured plastisol form.

9. A process in accordance with claim 1 in which the plastisol is a polyvinyl chloride plastisol.

10. A process in accordance with claim 1 in which the plastisol is a powdered polyvinyl bromide.

11. A process in accordance with claim 1 in which the plastisol is comprised of powdered polyvinyl chloride dispersed in a plasticizer therefor and up to 3% by weight of a heat and light stabilizer for the polyvinyl halide.

12. A process in accordance with claim 1 in which the plastisol is comprised of powdered polyvinyl halide which has been ground at temperatures below about 100° F. into an approximately equal weight of a plasticizer therefor, up to 3% by weight of a heat and light stabilizer, and from about 3% to about 20% by weight of powdered graphite.

13. A process in accordance with claim 1 in which the plastisol is composed of equal parts of powdered polyvinyl chloride and di-octyl phthalate, and contains dispersed therein about 2.5% by weight of dibasic lead phosphite.

14. A process for making molds which includes the steps of gelling a plastisol composed of equal parts of powdered polyvinyl chloride dispersed in di-octyl phthalate and up to 3% by weight of dibasic lead phosphite as a heat and light stabilizer by heating to a temperature of from about 210° F. to about 220° F. for a period of about 2 hours to a solid body, cooling said gelled plastisol, shaping the gelled plastisol body by removing material therefrom to form a design in the surface thereof, coating the surface with a thin coating of liquid plastisol of equivalent composition, reheating the shaped gelled plastisol to a temperature of from about 320° F. to 360° F. for about 1 hour, sensitizing the surface of the cured shaped plastisol to render it electrically conductive, electrolytically casting copper metal about said cured plastisol to a suitable thickness and removing the plastisol from the mold.

References Cited in the file of this patent

UNITED STATES PATENTS

| | | |
|---|---|---|
| 2,473,723 | Nelson | June 21, 1949 |
| 2,476,993 | Milton et al. | July 26, 1949 |

FOREIGN PATENTS

| | | |
|---|---|---|
| 600,270 | Great Britain | Apr. 5, 1948 |

OTHER REFERENCES

Baird: "P. V. C. Paste," British Plastics, Apr. 1948, pp. 167–171.